United States Patent [19]
Kerkman et al.

[11] Patent Number: 5,298,847
[45] Date of Patent: Mar. 29, 1994

[54] COUNTER EMF DETECTOR FOR USE IN ELECTRIC MOTOR CONTROLLERS

[75] Inventors: Russel J. Kerkman, Milwaukee County; Brian J. Seibel, Ozaukee County; Timothy M. Rowan, Milwaukee County, all of Wis.

[73] Assignee: Allen-Bradley Co., Inc., Milwaukee, Wis.

[21] Appl. No.: 875,912

[22] Filed: Apr. 29, 1992

[51] Int. Cl.$^5$ .............................................. H02P 7/00
[52] U.S. Cl. ...................................... 318/800; 318/799
[58] Field of Search ............. 318/799, 800, 801, 805, 318/806, 809, 437, 254, 138, 439, 807, 802, 803, 808, 811, 812, 687, 727; 323/217; 388/820, 821, 903, 917, 928.1

[56] References Cited

U.S. PATENT DOCUMENTS

| | | | |
|---|---|---|---|
| 3,789,291 | 1/1974 | Dinger et al. | 323/217 |
| 3,795,850 | 3/1974 | Grygera | 388/821 |
| 3,796,935 | 3/1974 | Blaschke | 318/801 |
| 3,812,409 | 5/1974 | Dinger | 388/820 |
| 3,813,591 | 5/1974 | Dinger | 388/820 |
| 3,904,942 | 9/1975 | Holtz | 318/687 X |
| 4,482,855 | 11/1984 | Otsuka et al. | 318/807 X |
| 4,743,815 | 5/1988 | Gee et al. | 318/254 |
| 4,808,903 | 2/1989 | Matsui et al. | 318/800 |
| 4,833,588 | 5/1989 | Schauder | 318/807 X |
| 4,900,993 | 2/1990 | Yasohara et al. | 318/254 |
| 4,942,344 | 7/1990 | Devitt et al. | 318/254 |

*Primary Examiner*—Jonathan Wysocki
*Attorney, Agent, or Firm*—John J. Horn; H. Frederick Hamann

[57] ABSTRACT

A non-invasive system for accurately determining the counter EMF or speed voltages in an electric motor during motor operation. The system includes a mechanism for determining the phase angle of the stator current within the dq frame of reference and a mechanism for transforming feedback voltages into a new frame of reference defined by this phase angle. The speed voltage values thereby detected are free from stator resistance effects and represent parameters of improved accuracy which can be used in motor control functions.

11 Claims, 5 Drawing Sheets dq SYSTEM

COUNTER EMF DETECTOR FOR USE IN ELECTRIC MOTOR CONTROLLERS

BACKGROUND OF THE INVENTION

The present invention relates to systems for controlling electric motors and, more particularly, to systems for deriving accurate input parameters for use by electric motor controllers.

All electric motors are characterized by a counter EMF which opposes the terminal voltage during the operation of the motor. For example, in accordance with the dq axis model of an AC induction motor the counter EMF components or speed voltages $w_e\lambda_{qe}$ and $w_e\lambda_{de}$ along the d and q axes in the synchronous frame of reference are related to other voltage parameters as shown in equations 1 and 2 below:

$$V_{qe} = r_s i_{qe} + w_e\lambda_{de} + p\lambda_{qe} \quad \text{eq. (1)}$$

$$V_{de} = r_s i_{de} - w_e\lambda_{qe} + p\lambda_{de} \quad \text{eq. (2)}$$

where:
- $V_{qe}, V_{de}$ = terminal voltage components
- $r_s$ = stator resistance
- $i_{qe}, i_{de}$ = terminal current components
- $w_e$ = field frequency
- $\lambda_{de}, \lambda_{qe}$ = flux linkage components
- p = derivative operator Equations 1 and 2 can be simplified for steady state conditions and solved for the speed voltages as shown in equations 3 and 4 below:

$$w_e\lambda_{de} = V_{qe} - r_s i_{qe} \quad \text{eq. (3)}$$

$$w_e\lambda_{qe} = r_s i_{de} - V_{de} \quad \text{eq. (4)}$$

Deriving the counter EMF components is then simply a matter of measuring the terminal voltages, transforming into the synchronous frame of reference and differencing these voltages with the voltage drops $r_s i_{qe}$ and $r_s i_{de}$. However, while the currents $i_{qe}$ and $i_{de}$ can be sensed or formulated as command quantities, the stator resistance $r_s$ is difficult to ascertain with accuracy under most operating conditions. Fixed estimates of stator resistance $r_s$ are quickly rendered inaccurate by conditions inherent in motor operation which cause heating of the stator winding. Alternately, direct measurements may be made of stator resistance $r_s$ by the injection of signals into the stator winding. However, such signal injections inevitably result in disturbance of the motor system which is unacceptable under most operating conditions. Therefore, while the speed voltages remain important quantities to be determined in many motor control systems, adequate techniques have not been available for deriving these quantities with accuracy during motor operation.

It is therefore an object of the present invention to provide a system for determining counter EMF parameters during motor operations with a high degree of accuracy.

It is yet another object of the present invention to provide a system for determining counter EMF or speed voltage parameters during motor operations which is not invasive and provides no disturbance of the motor system.

SUMMARY OF THE INVENTION

The present invention comprises a non-invasive system for accurately determining counter EMF or speed voltages in an electric motor during motor operation. The system of the present invention includes a mechanism for determining the phase angle of the stator current within the dq frame of reference and a mechanism for transforming a torque related feedback voltage within the dq frame of reference into a new frame of reference as defined by the phase angle of the stator current. Speed voltage values can thereby be detected free from contamination due to voltage drops resulting from stator resistance so that motor control functions which operate in accordance with speed voltage parameters can be accurately and reliably implemented.

In the preferred embodiment, the system of the present invention is adapted for use in generating current command signals based on voltage feedback and command inputs for supply to a current regulator for controlling a voltage inverter providing the drive signals to an AC induction motor. A torque-related command voltage is also formed within the new d'q' frame of reference defined by the phase angle of the stator current. The torque-related command voltage is differenced with the torque-related feedback voltage to generate a flux related error signal. This error signal is then used in generating a slip frequency command for the AC induction motor based on voltage feedback whereby the motor can dynamically arrive at the proper command values for its operation.

DESCRIPTION OF THE PREFERRED EMBODIMENT

Figure 1:
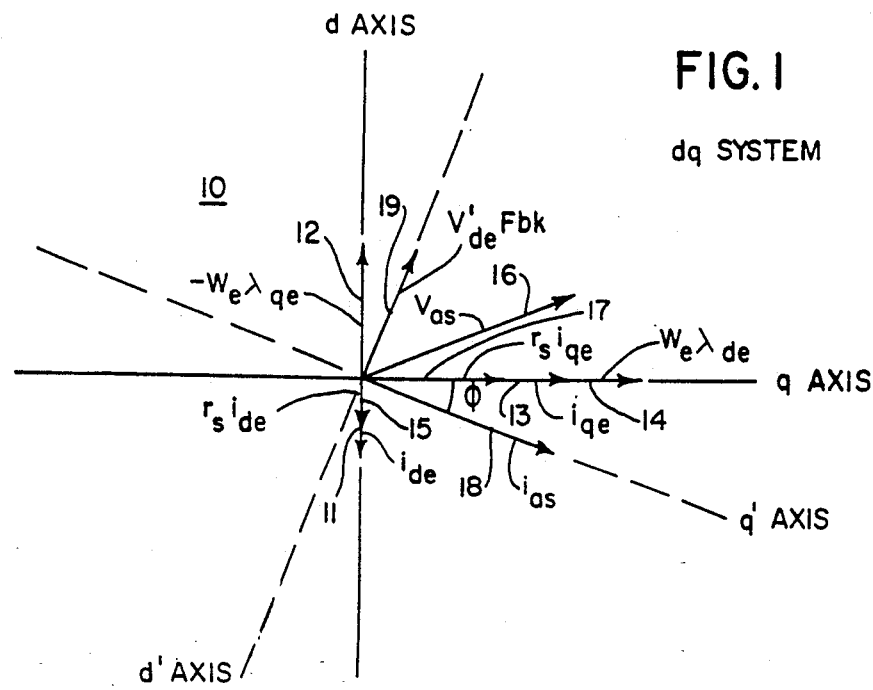
FIG. 1 provides a graph in the dq reference system of a number of important electrical quantities characteristic of the operation of an AC induction motor which are illustrative of the principles of operation of the present invention.

Referring now to FIG. 1, The graph 10 depicts vectorial relationships between the speed voltages 12 and 14, the voltage and current phasors 16 and 18, the current components 11 and 13 and the resistive voltage drops 15 and 17 due to the current components 11 and 13. It can be readily observed from the graph 10 that any attempt to determine the speed voltage 12 ($w_e\lambda_{qe}$) on the d axis based on terminal voltages leads to inherent contamination by a voltage drop component 15 ($r_s i_{de}$) also along the d axis and arising from the interaction of the current phasor 18 ($i_{as}$) and the stator resistance $r_s$. However, if the coordinate frame of reference is transformed by an angle $\phi$ corresponding to the angle between the original q axis and the current phasor 18 ($i_{as}$), then d axis (or rather d' axis) measurements of counter EMF values are no longer contaminated with voltage drop components due to the stator resistance since the current phasor 18 ($i_{as}$) is in quadrature with the new d' axis. Therefore, measurements of the counter EMF with reference to a new d' axis which is shifted by the angle $\phi$ with respect to the original d axis such as the vector 19 ($V'_{de}$Fbk) are more indicative of the true changes in the magnitude of the speed voltage 12 ($w_e\lambda_{qe}$). While the speed voltage value on the new d' axis includes a new flux-related component due to 14 ($w_e\lambda_{de}$) this component turns out to be easily accounted for and not of importance for feedback control purposes in the system 50 in which changes in magnitude are of greatest impact.

Figure 2:
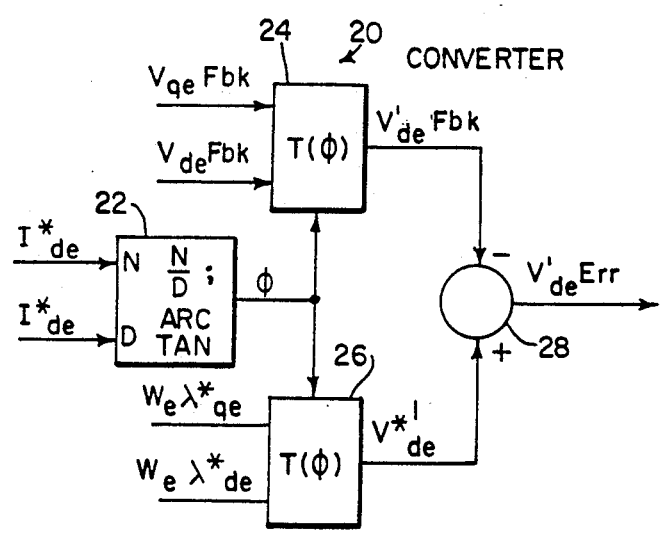
FIG. 2 provides a block diagram of a converter system which utilizes the present invention in generating a voltage error signal useful for motor control applications.

Referring now to FIG. 2, a d' axis converter 20 is shown as including four operational blocks 22, 24, 26 and 28 for receiving six inputs $V_{qe}$Fbk, $V_{de}$Fbk, $I^*_{de}$, $I^*_{qe}$, $w_e\lambda^*_{qe}$ and $w_e\lambda^*_{de}$ representing voltage feedback, current command and speed voltage command parameters and finally generating a torque/slip voltage error signal $V'_{de}$Err. It should be noted for purposes of the following descriptions that due to the phase shift between current and voltage and cross-coupling of the speed voltages, d axis voltage parameters relate to torque/slip and q axis voltage parameters relate to flux while d axis current parameters relate to flux and q axis current parameters relate to torque/slip. In block 22 a ratio $I^*_{de}/I^*_{qe}$ of command currents is formed and the arctangent is taken of this ratio to generate an angle $\phi$ representing the angular displacement between a q axis and a q' axis (in a new d'q' reference frame in which the d' axis is in quadrature with the phase current). In the block 24 the terminal voltage feedback signals $V_{qe}$Fbk and $V_{de}$Fbk undergo a coordinate transformation as a function of the angle $\phi$ to yield a voltage signal $V'_{de}$Fbk representing a torque feedback voltage free from contamination due to stator resistance effects as shown in equation 5 below:

$$V'_{de}Fbk = (V_{qe}Fbk)(\sin\phi) + (V_{de}Fbk)(\cos\phi) \qquad \text{eq. (5)}$$

In the block 26 the speed voltage command signals $w_e\lambda^*_{qe}$ and $w_e\lambda^*_{de}$ also undergo a coordinate transformation as a function of the angle $\phi$ to produce torque/slip voltage command signal $V'^*_{de}$ which is also free from stator resistance effects as shown in equation 6 below:

$$V'^*_{de} = (w_e\lambda^*_{de})(\sin\phi) + (w_e\lambda^*_{qe})(\cos\phi) \qquad \text{eq. (6)}$$

The torque/slip voltage feedback signal $V'_{de}$Fbk and the torque/slip voltage command signal $V'^*_{de}$ are differenced in the block 28 to generate a voltage error signal $V'_{de}$Err which constitutes the final output of the converter 20. It should be noted that the converter 20 takes the present invention a step forward in producing a torque/slip voltage error signal of the type useful in many motor control applications although the primary functionality of the present invention is expressed in blocks 24 and 26 wherein the signals $V'_{de}$Fbk and $V'^*_{de}$ which are free from contamination due to resistive effects are first detected.

Figure 3:
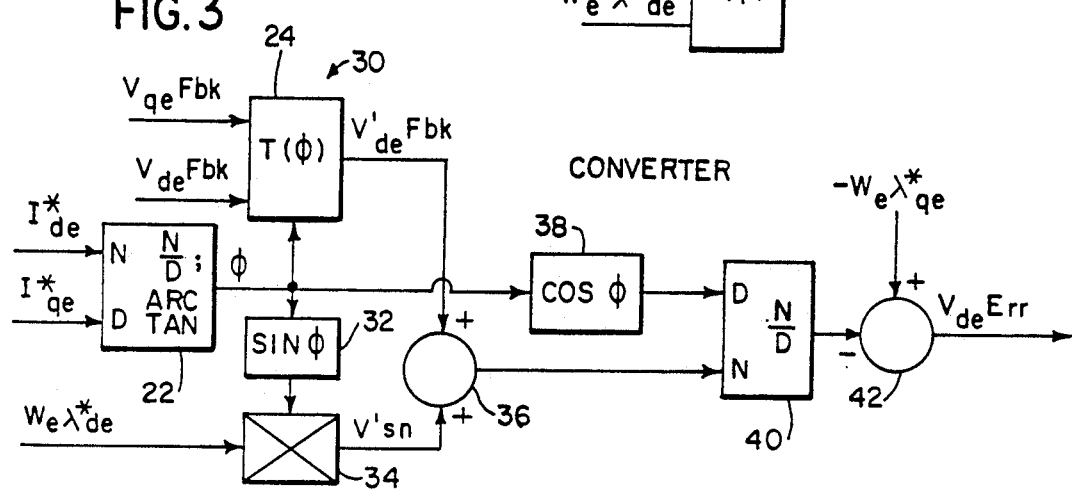
FIG. 3 provides a block diagram of an alternative type of the converter system of which utilizes the present invention in generating a voltage error signal useful in controlling electric motors.
Figure 4:
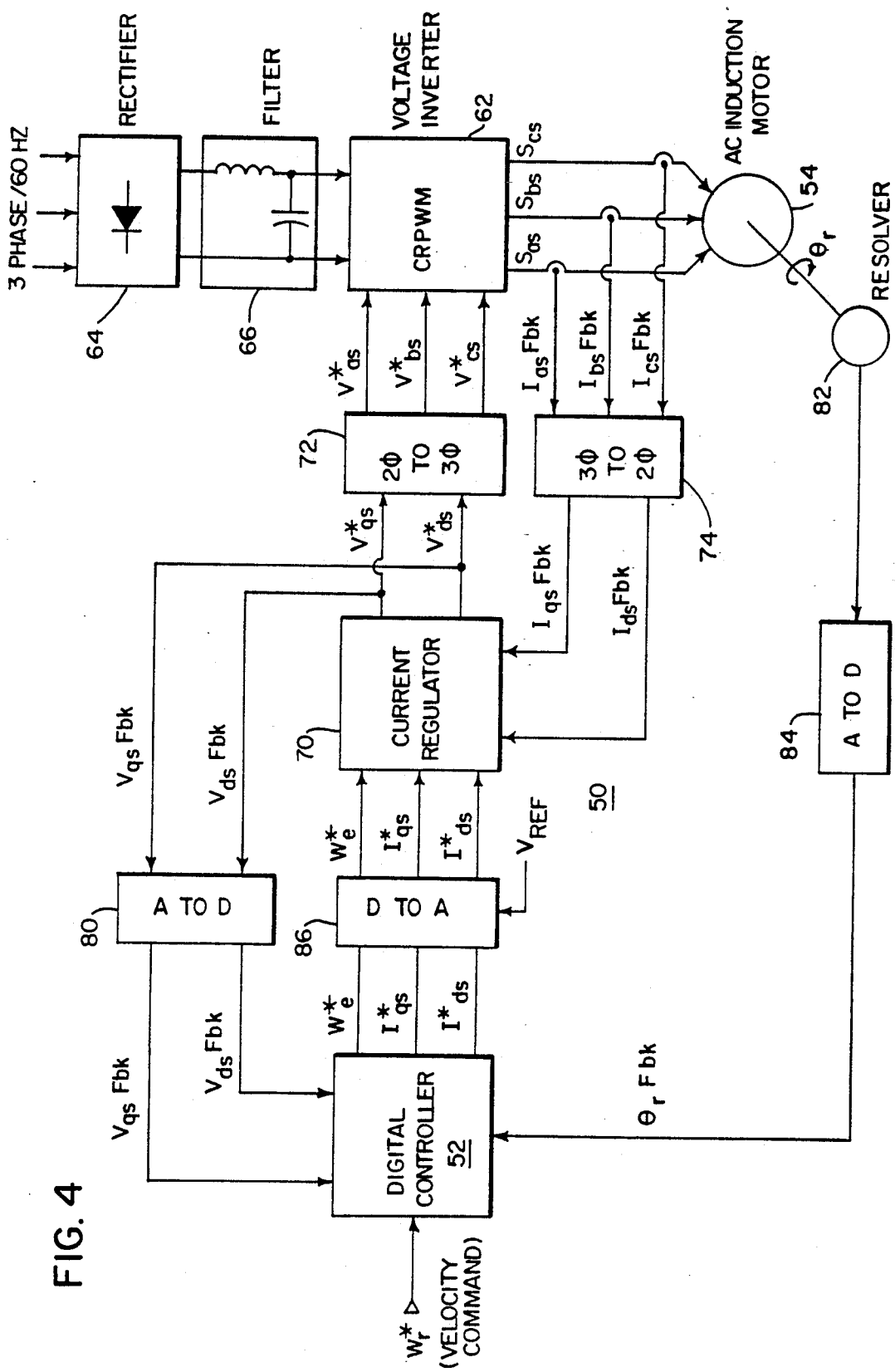
FIG. 4 provides an overall block diagram of a control system for use in controlling an AC induction motor in accordance with a torque command using voltage feedback to dynamically arrive at suitable current and field frequency command values.

Referring now to FIG. 3, a d axis convertor 30 is shown as including eight operational blocks 22, 24, 32, 34, 36, 38, 40 and 42 for receiving the six inputs $V_{qe}$Fbk, $V_{de}$Fbk, $I^*_{de}$, $I^*_{qe}$, $w_e\lambda^*_{qe}$ and $w_e\lambda^*_{de}$ and finally generating a torque/slip voltage error signal $V_{de}$Err. The convertor 30 offers an alternative configuration for computing a corrected speed voltage error signal which is projected onto the original d axis in the original dq frame of reference. In block 22 a ratio $I^*_{de}/I^*_{qe}$ of command currents is formed and the arctangent is taken of this ratio to generate an angle $\phi$ representing the angle between a q axis and q' axis. In the block 24 the terminal voltage feedback signals $V_{qe}$Fbk and $V_{de}$Fbk undergo a coordinate transformation as a function of the angle $\phi$ to yield a voltage signal $V'_{de}$Fbk representing a torque/slip feedback voltage substantially free from contamination due to stator resistance effects. In the block 32 the angle $\phi$ is used in forming the trigonometric quantity $\sin\phi$ which is multiplied by the speed voltage command signal $w_e\lambda^*_{de}$ to generate a voltage signal $V'_{sn}$. The voltage signals $V'_{de}$Fbk and $V'_{sn}$ are added together in block 36 and supplied to the divider 40. The divider 40 also receives a signal from block 38 representing the trigonometric quantity $\cos\phi$ which is formed in block 38 based on the value of the angle $\phi$ provided from block 22. The divider 40 divides the signal corresponding to ($V'_{de} + V'_{sn}$) supplied from the summing block 36 by the value of trigonometric quantity $\cos\phi$ supplied from block 38 and provides the resulting quotient to the summing block 42 where this quotient is differenced with the speed voltage command signal $w_e\lambda^*_{qe}$ to form a final torque/slip voltage error signal $V_{de}$Err. The operation of the converter 30 may be better understood with reference to equations 7, 8 and 9 below:

$$V_{de}Fbk - V^*_{de} = V_{de}Err \qquad (7)$$

$$V_{de}Fbk - (w_e\lambda^*_{qe}\cos\phi + w_e\lambda^*_{de}\sin\phi) = V_{de}Err \qquad (8)$$

$$\frac{V_{de'}Fbk - w_e\lambda_{de}^*\sin\phi}{\cos\phi} - w_e\lambda_{qe}^* = \frac{V_{de'}Err}{\cos\phi} = V_{de}Err \qquad (9)$$

which illustrate how the blocks shown in FIG. 3 correspond to the original principle of differencing voltage feedback with voltage command signals to form a voltage error signal which in this case is adapted to the original d axis.

Figure 5:
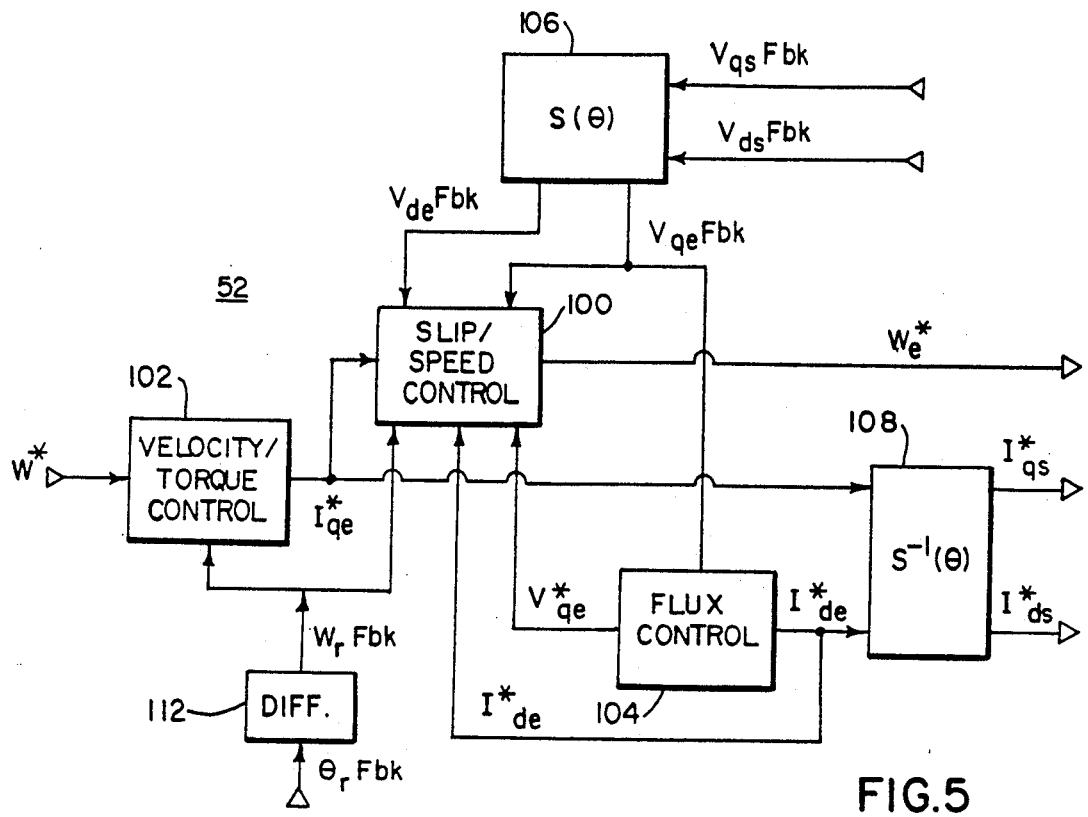
FIG. 5 provides a block diagram of the major process program steps or routines within the software for the digital controller of the control system shown in FIG. 4.

Referring now to FIG. 5, the present invention finds its primary application in motor control systems of the type which use voltage feedback. The motor control system 50 comprises an indirect self organized field oriented controller in which the signals $V_{qs}$Fbk and $V_{ds}$Fbk are fed back to a digital controller 52 to provide an indication of the present speed voltages of the AC induction motor 54 for use in generating command signals for supply to the current regulator 70. It should be noted that initial values for key command parameters ($W^*_e$, $K_t$, $V^*_{de}$, $V^*_{qe}$ and $K_s$) are set upon commissioning of the control system 50 to allow for effective start-up. The signal converter of the present invention is employed as a part of the digital controller 52 as will be explained hereinafter.

The motor controller 50 includes a current regulated pulse width modulated voltage inverter 62 which supplies a set of three drive signals $S_{as}$, $S_{bs}$ and $S_{cs}$ to the induction motor 54. The rectifier 64 receives three phase AC power signals at a line frequency of 60 Hz and it converts these signals to a single DC signal which is passed through the filter 66 to provide the voltage inverter 62 with a relatively stable DC input of constant magnitude.

The voltage inverter 62 includes a group of switching elements which are turned on and off as a function of the control signals $V^*_{as}$, $V^*_{bs}$ and $V^*_{cs}$ which originate from the current regulator 70 in order to convert the DC voltage from the rectifier 64 into three streams of high frequency pulses of constant magnitude but varying pulse width and polarity which comprise the drive signals $S_{as}$, $S_{bs}$ and $S_{cs}$. The pulse trains comprising the drive signals $S_{as}$, $S_{bs}$ and $S_{cs}$ are characterized by alternating sets of positive going pulses of increasing and then decreasing pulse width and negative going pulses of increasing and then decreasing pulse width resulting in signals having RMS values which approximate AC waveforms. The current regulator 70 provides a pair of (two phase) voltage command signals $V^*_{qs}$ and $V^*_{ds}$ in the stationary dq frame of reference to a 2-to-3 phase converter 72 which converts these signals into the command signals $V^*_{as}$, $V^*_{bs}$ and $V^*_{cs}$ which are supplied to and govern the operation of the voltage inverter 62. Simultaneously, the current levels of the drive signals $S_{as}$, $S_{bs}$ and $S_{cs}$ are sensed and fed back to a 3-to-2 phase converter 74 as the signals $I_{as}$Fbk, $I_{bs}$Fbk, $I_{cs}$Fbk (Note: $I_{cs}$Fbk = $I_{as}$Fbk − $I_{bs}$Fbk and therefore $I_{cs}$ does not need to be directly sensed and instead can be derived from $I_{as}$ and $I_{bs}$) which are converted by the converter 74 into a pair of (two phase) signals $I_{qs}$Fbk, and $I_{ds}$Fbk in the stationary dq frame of reference for supply to the current regulator 70.

The current regulator 70 is responsive to the input command signals $w^*_e$, $I^*_{qs}$ and $I^*_{ds}$ from the digital controller 52 and the current feedback signals $I_{qs}$Fbk and $I_{ds}$Fbk for generating the voltage command signals $V^*_{qs}$ and $V^*_{ds}$. The current regulator 70 is of the synchronous type including two channels on which the d and q axis signals are separately processed. First, the current command signals $I^*_{qs}$ and $I^*_{ds}$ are differenced with the current feedback signals $I_{qs}$Fbk and $I_{ds}$Fbk with the resulting current error signals being processed through proportional integral control loops. Additionally, current error signals from each channel are cross-coupled between the channels as product functions of the field frequency $w^*_e$. The current regulator 70 is accordingly functional for producing the command signals $V^*_{qs}$ and $V^*_{ds}$ based on current errors and for maintaining the vector orientation of these output signals to the d and q axis. The details of the circuitry for a suitable synchronous current regulator 70 have been previously shown and described in U.S. Pat. No. 4,680,695 issued Jul. 14, 1987 which is incorporated herein by reference.

The motor command signals $V^*_{qs}$ and $V^*_{ds}$ are also utilized as terminal voltage feedback signals $V_{qs}$Fbk and $V_{ds}$Fbk which are digitized by being passed through an A-to-D convertor 80 and then supplied to the digital controller 52 although these feedback signals could be alternatively generated based on the voltage levels of the drive signals $S_{as}$, $S_{bs}$ and $S_{cs}$. The digital controller 52 also receives a feedback signal $\theta_r$Fbk indicative of the position of the rotor within the induction motor 54 which is generated by the resolver 82 and digitized by the A-to-D converter 84 before being supplied to the digital controller 52. Finally, the digital controller 52 receives a velocity command input $W^*_r$ which may be manually provided by a machine operator or supplied from a higher level control system for the torque of the induction motor 54 to which it responds by producing the digital command signals $w^*_e$, $I^*_{qs}$ and $I^*_{ds}$ which are passed through a multiplying D-to-A converter 86 prior to being supplied to the current regulator 70. The control system 50 should be understood as providing a primary current regulation function in response to a current command vector defined by the command signals $I^*_{qs}$ and $I^*_{ds}$. However, the command signals provided to the current regulator 70 are generated in response to voltage feedback provided to the controller 52 as well as the command input $W^*_r$ which allows the controller 50 to be "self-organized" and to be dynamically responsive to actual motor conditions.

Referring now to FIG. 5, the digital controller 52 is shown as including three primary control blocks, a slip/speed control block 100, a velocity/torque control block 102, and a flux control block 104. It should be remembered that all of the blocks, steps and/or functions described in the operational blocks for the digital controller 52 are expressed in software as computer programs and represent algorithms for execution by a conventional type digital processor adapted for industrial applications such as a model 8096 microelectronic processor as supplied by Intel Corporation of Santa Clara, Calif. The voltage feedback signals $V_{qs}$Fbk and $V_{ds}$Fbk are first supplied to the rotating-to-synchronous transform block 106 and are transformed into the synchronous frame of reference in accordance with the function $s(\theta)$ as shown in matrix equation 10 below:

$$\begin{bmatrix} V_{qe}Fbk \\ V_{de}Fbk \end{bmatrix} = \begin{bmatrix} \cos\theta & -\sin\theta \\ \sin & \cos\theta \end{bmatrix} \begin{bmatrix} V_{qa}Fbk \\ V_{ds}Fbk \end{bmatrix} \qquad \text{eq. (10)}$$

and the resulting voltage feedback signals in the synchronous frame of reference $V_{de}$Fbk and $V_{qe}$Fbk are supplied to the slip/speed control block 100 and the flux control block 104. The motor shaft position feedback signal $\theta_r$Fbk is supplied to the differentiater block 112 at which it is operated on to derive a motor speed feedback signal $w_r$Fbk which is then furnished to the velocity/torque control block 102 and the slip/speed control block 100. The command current outputs $I^*_{de}$ and $I^*_{qe}$ from the flux control and velocity/torque control blocks 104 and 102 are both furnished as inputs to the slip/speed control block 100 along with the flux voltage command signal $V^*_{qe}$ which is also generated by the flux control block 104. Finally the current command signals $I^*_{qe}$ and $I^*_{de}$ are supplied to a synchronous-to-rotating transform block 108 and are transformed into the rotating frame of reference in accordance with the function $S^{-1}(\theta)$ as shown in matrix equation 11 below:

$$\begin{bmatrix} I_{qs}^* \\ I_{ds}^* \end{bmatrix} = \begin{bmatrix} \cos\theta & \sin\theta \\ -\sin\theta & \cos\theta \end{bmatrix} \begin{bmatrix} I_{qe}^* \\ I_{de}^* \end{bmatrix} \qquad \text{eq. (11)}$$

and the resulting current command signals in the rotating frame of reference $I^*_{qs}$ and $I^*_{ds}$ are supplied to the D-to-A converter 86 along with the field frequency command signal $w^*_e$.

Figure 6:
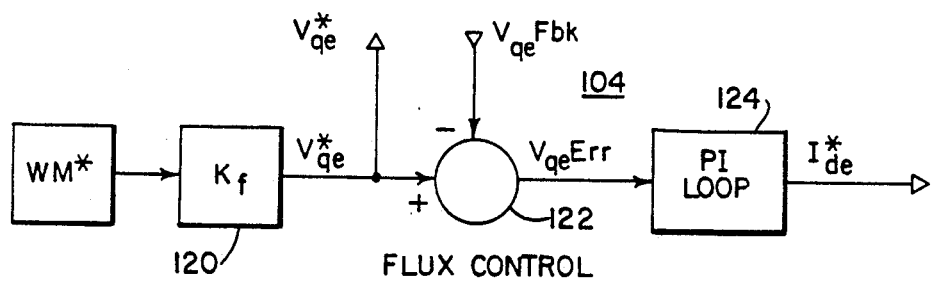
FIG. 6 provides a block diagram of the process steps comprising the flux control block shown in FIG. 5 which comprise part of the software for the digital controller.

Referring now to FIG. 6, the flux control block 104 operates in response to the input signals $W^*_e$ and $V_{qe}$Fbk to generate a flux-related current command $I^*_{de}$ which is supplied to the (reverse) transform block 108. The input command $W^*_e$ is appropriately scaled in block 120 in accordance with a constant factor $K_f$ to form a flux voltage command $V^*_{qe}$ which is supplied to the summing block 122. The flux voltage command $V^*_{qe}$ is differenced with the flux feedback voltage $V_{qe}$Fbk in the summing block 122 with the resulting error signal $V_{qe}$Err being supplied to the proportional integral control loop 124. The signal $V_{qe}$Err is filtered in the loop 124 to generate the flux-related current command $I^*_{de}$.

Figure 7:
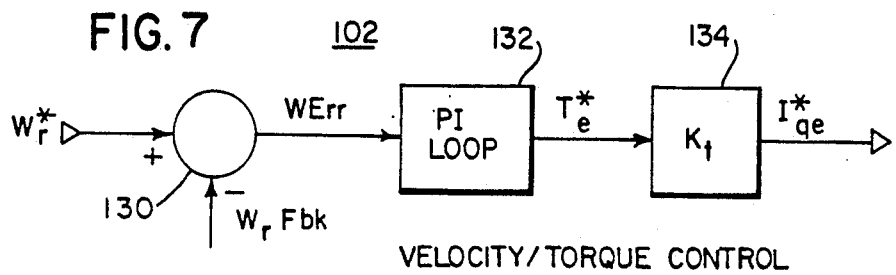
FIG. 7 provides a block diagram of the process steps comprising the velocity/torque control block shown in FIG. 5 which comprise part of the software for the digital controller.

Referring now to FIG. 7, the velocity/torque control block 102 receives input signals $W^*_r$ and $w_r$Fbk and generates a torque-related command current $I^*_{qe}$ which is supplied to the (reverse) transform block 108. The velocity command $W^*_r$ is supplied by the operator and translates into a desired level of torque and associated slip. The velocity command signal $W^*_r$ is differenced with the shaft speed feedback signal $w_r$Fbk in the summing block 130 and the resulting error signal wErr is supplied to the proportional integral control loop 132. The error signal wErr is filtered in the loop 132 to generate the torque command $T^*_e$ which is scaled in accordance with a fixed factor $K_t$ in block 134 to produce the torque-related current command $I^*_{qe}$.

Figure 8:
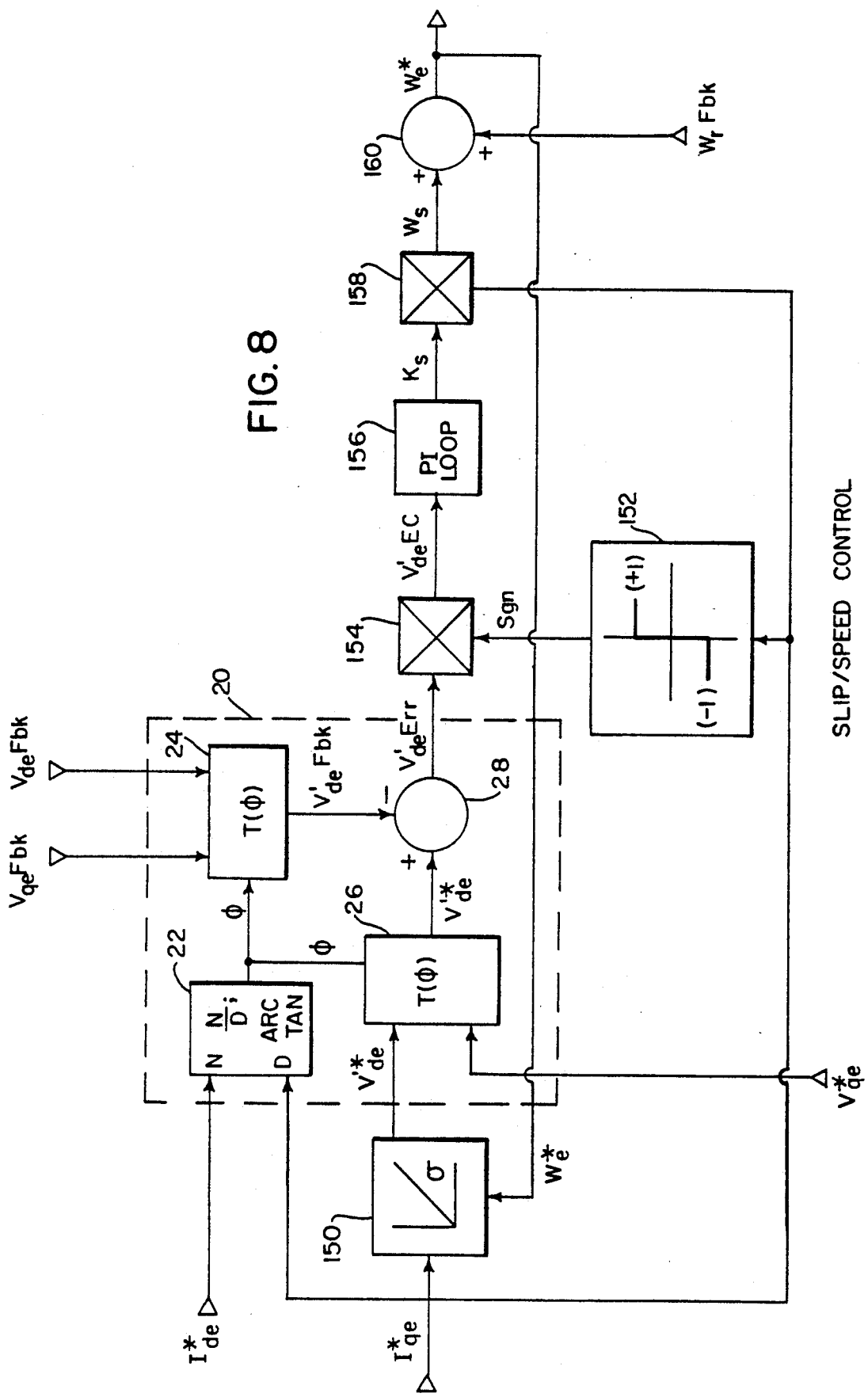
FIG. 8 provides a block diagram of the process steps comprising the slip/speed control block shown in FIG. 5 as a part of the software for the digital controller.

Referring now to FIG. 8, the slip/speed control block 100 includes nine separate subblocks 150, 20, 152, 154, 156, 158 and 160 each of a comprises a separate step for execution by the microprocessor of the digital controller 52. The control block 100 receives six input signals $I^*_{qe}$, $I^*_{de}$, $V^*_{qe}$, $V_{qe}$Fbk, $V_{de}$Fbk and $w_r$Fbk and processes these signals to generate a field frequency command signal $w^*_e$ which is supplied directly to the D-to-A converter 86. The operation of the block 100 is key to the overall operation of the controller 50 in that it computes the appropriate slip frequency ws for the induction motor 54 in view of the command values and the motor conditions indicated by the feedback voltages.

In accordance with block 150, the torque-related current command $I^*_{qe}$ is multiplied by the field frequency command $w^*_e$ which is fed back from the output of the summing block 160 and the resulting product is scaled in accordance with a factor $\sigma$ provided from a look-up table. The scaling factor $\sigma$ may be made a function of the field frequency $w_e^*$ to improve the response of the system at high torques. The torque command voltage $V^*_{de}$ is supplied as an input to the converter 20 along with the flux command voltage $V^*_{qe}$. The torque feedback voltage $V_{de}$Fbk and the flux feedback voltage $V_{qe}$Fbk are similarly supplied to the converter 20 along with the command currents $I^*_{qe}$ and $I^*_{de}$. The extractor blocks 24 and 26 operate separately on the command and feedback voltages in order to transform them into a new coordinate frame of reference in accordance with a phase angle $\phi$ based on the current command values. The extractor blocks 24 and 26 thereby generate torque or slip related feedback voltages $V'^*_{de}$ and $V'_{de}$Fbk which are in a new d'q' coordinate system and which are substantially free of contamination due to stator resistance effects. The voltages $V'^*_{de}$ and $V'_{de}$Fbk are differenced at the summing block 28 to produce a slip-related error voltage $V'_{de}$Err which is also substantially free from contamination due to stator resistance effects. It should be noted that operation of block 20 is in accordance with the previous descriptions provided with respect to the converter 20 of FIG. 2 with $V^*_{qe} = w_e\lambda^*_{de}$ and $V^*_{de} = -w_e\lambda^*_{qe}$.

The sign of the current command $I^*_{qe}$ is taken in block 158 and a signal Sgn is formed which equals $-1$ for negative values of the torque-related command current and $+1$ for positive values of the torque-related command current. The signal Sgn is multiplied by the voltage error signal $V'_{de}$Err in block 160 to provide a voltage error signal $V'_{de}$EC which has coherent polarity for control purposes. The voltage error signal $V'_{de}$EC is supplied to a proportional integral control loop 156 in which it is filtered to provide a signal $K_s$ representing a slip multiplier. The slip multiplier $K_s$ is then multiplied by the torque-related command current $I^*_{qe}$ in block 158 to yield a slip frequency $w_s$. Finally, the slip frequency $w_s$ is added to the shaft speed feedback signal $w_r$Fbk to form the field frequency command signal $w^*_e$ which is the output of the block 100.

Figure 9A:
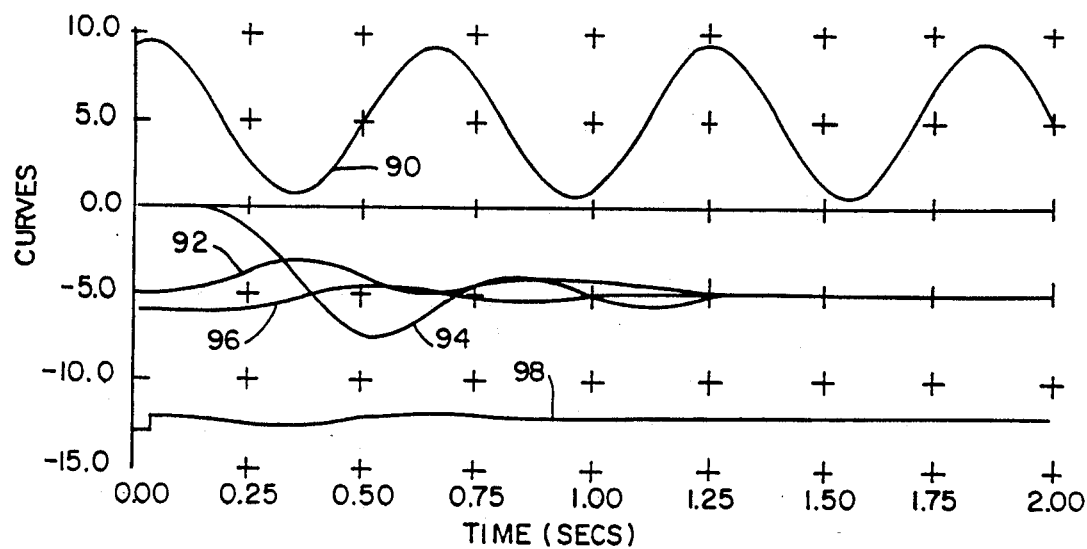
FIGS. 9A and 9B provide graphical information based on computer simulation data of the effects of the operation of the present invention on key control parameters during motor start-up.
Figure 9B:
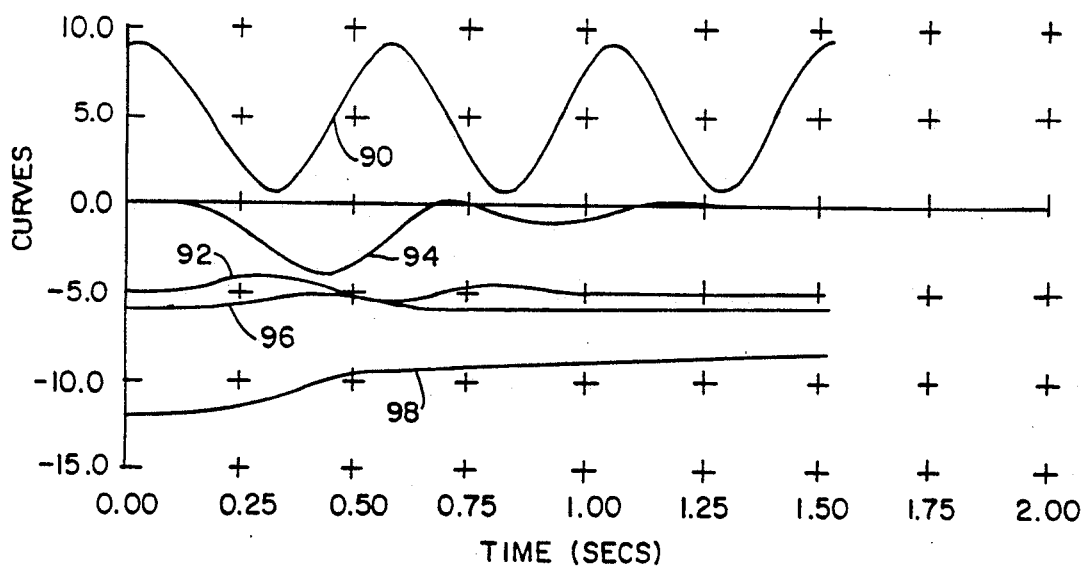

Referring now to FIGS. 9A and 9B, graphs are shown including curves 90, 92, 94, 96 and 98 representing the phase current $i_{as}$, the q-axis rotor flux $\lambda_{qer}$, the torque error $(T^*-T_e)$, the torque $T_e$ and the slip multiplier $K_s$. In order to provide the data with better viewability the quantities represented by the curves 90, 92, 94, 96 and 98 have been scaled and positioned with respect to the y axis as shown in table I below:

TABLE I

| Curve | Quantity | Expression Plotted |
| --- | --- | --- |
| curve 90 | phase current | $(K_1 i_{as}) + 5$ |
| curve 92 | q-axis rotor flux | $(\lambda_{qer}*10) - 5$ |
| curve 94 | torque error | $(T^*_e - T_e)$ |
| curve 96 | torque | $(T_e/5) - 10$ |
| curve 98 | slip multiplier | $10(K_s - 1) - 13$ |

In FIG. 9A, the operation of a control system 50 is shown in accordance with simulation data under start-up conditions without use of the counter EMF detector of the present invention. Consequently, the speed voltages values which are used by the slip/speed control block 100 are contaminated by resistive effects due to changes in stator resistance on account of heating of the stator leading to a substantial torque error and a significant loss of field orientation during start-up as shown by curves 94 and 92. In FIG. 9B, the operation of a control system 50 is shown in accordance with simulation data under start-up conditions with the use of the counter EMF detector of the present invention. The speed voltages fed back to the slip/speed control block 100 are corrected for resistive effects due to stator resistance. As demonstrated by the curve 94 the torque error quickly approaches zero. Meanwhile, as shown by curve 92, a greater degree of field orientation is maintained by the system as start-up proceeds. The curve 98 illustrates the slip multiplier changing to eliminate the torque error in accordance with the operation of the invention. FIGS. 9A and 9B clearly demonstrate the value of the present invention in reducing torque error and maintaining field orientation.

While particular embodiments of the present invention have been shown and described, it should be clear that changes and modifications may be made to such embodiments without departing from the true scope and spirit of the invention. It is intended that the appended claims cover all such changes and modifications.

We claim:

1. In an electric motor control system which is subject to control by a current regulator in accordance with a current command vector in the dq frame of reference and in which feedback of the motor stator terminal voltages is used for motor control purposes as an indication of the counter EMF generated within the motor, the improvement comprising:

means for transforming said terminal voltages into $V_d$ and $V_q$ voltage components in the synchronous dq frame of reference;

means for calculating the phase angle of the current command vector in the synchronous dq frame of reference; and means for operating on said $V_d$ and $V_q$ voltage components to generate a new voltage component $V'_d$ in a new coordinate frame of reference defined by said phase angle, said new voltage component corresponding to a torque/slip-related counter EMF which is substantially free from voltage drop elements attributable to stator resistance.

2. The improvement of claim 1, in which said means for calculating the phase angle includes means for forming the ratio of d and q axis current commands and taking the arctangent of said ratio.

3. The improvement of claim 2, in which said means for using said $V_d$ and $V_q$ voltage components operates in accordance with the equation:

$$V_d = V_q \sin\phi + V_d \cos\phi$$

Where:

$\phi$ = current command phase angle

4. A drive for controlling an induction motor, comprising:

a voltage inverter for generating voltage signals to be applied to the stator of said induction motor;

a current regulator for controlling said voltage inverter in response to a frequency command signal, d and q axis current command signals and d and q axis current feedback signals;

means for generating said frequency command signal and said d and q axis current command signals in response to a rotor speed feedback signal, a velocity command signal and d and q axis feedback signals representative of stator voltage levels, said means for generating said signals including means for computing a signal representing the phase angle of the current command vector defined by said current command signals and using said phase angle signal in calculating a new d' axis feedback signal in a new coordinate frame of reference based on said phase angle in which said new feedback signal is substantially free from voltage drop elements attributable to stator resistance.

5. The drive of claim 4, in which said means for generating said signals includes means for forming the ratio of the d and q axis current command signals and forming a signal representing the arctangent of said ratio.

6. The drive of claim 5, in which said d' axis feedback signal is calculated in accordance with the equation:

$$V_d = V_d \cos\phi + V_q \sin\phi$$

Where:

$\phi$ = current command phase angle

7. The drive of claim 4, wherein said means for generating said frequency command signal includes means for forming a voltage error signal which is free from contamination arising from stator resistance effects and which can be used to generate a command signal to control rotor slip.

8. The drive of claim 4, wherein said means for generating said frequency command signal and said d and q axis current command signals includes means for generating d and q axis voltage command signals and transforming said d axis voltage command signal into a new frame of reference using said phase angle signal and includes means for differencing said d axis voltage command signal as transformed into said new frame of reference with said new d axis feedback signal as transformed into said new frame of reference to form a voltage error signal which may be used in generating said frequency command signal.

9. A method of detecting the counter EMF generated in an electric motor subject to current regulation in accordance with a current command vector in the dq reference frame, comprising the steps of:

a) sensing the voltage levels at the stator terminals of said electric motor in order to provide stator voltage signals representative of said voltages levels;

b) converting said voltage signals into d and q axis voltage component signals in the dq frame of reference;

c) generating a signal representative of the phase angle of current command vector in the dq frame of reference with respect to the dq coordinate axes; and d) transforming said d axis voltage component into a new reference frame defined by said phase angle in order to produce a new d' axis voltage component which accurately corresponds to said counter EMF despite stator resistance conditions.

10. The method of claim 9, in which said step of generating a signal representative of phase angle includes substeps of forming a ratio of the d and q axis components of said current control vector and taking the arctangent of said ratio.

11. The method of claim 9, in which said step of transforming said d axis voltage component into a new frame of reference is performed in accordance with the equation:

$$V_{de} = V_{de} \cos\phi + V_{qe} \sin\phi$$

Where:

$\phi$ = current command phase angle $V'_{de}$ = voltage component in new reference frame $V_{de}, V_{qe}$ = original voltage components in the dq reference frame.

* * * * *